March 18, 1947.     A. B. McGINNIS     2,417,510
PLASTIC ARTICLE
Filed March 22, 1943
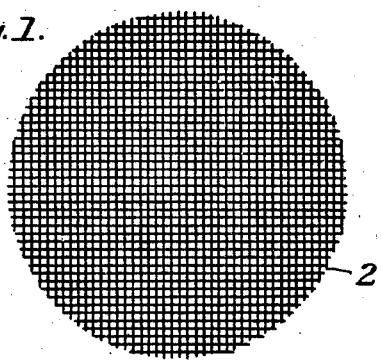
Fig. 1.
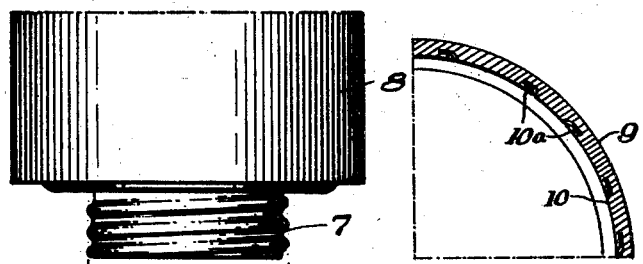
Fig. 2.     Fig. 5.
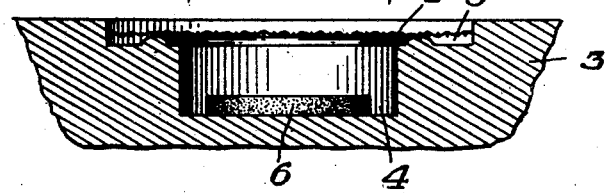
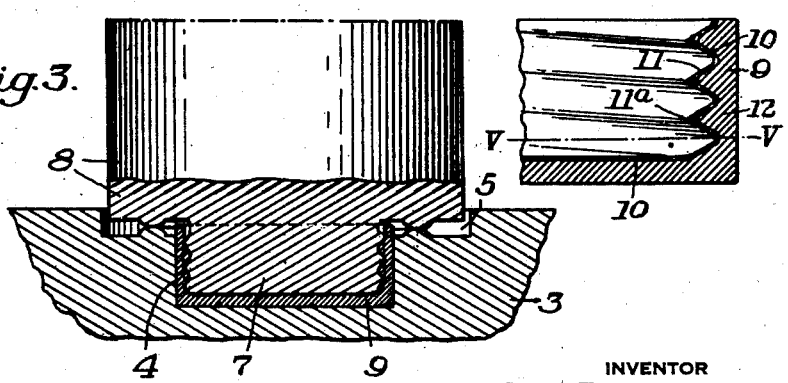
Fig. 3.     Fig. 4.
INVENTOR
Archibald B. McGinnis
by his attorneys Patented Mar. 18, 1947

2,417,510

UNITED STATES PATENT OFFICE 2,417,510

PLASTIC ARTICLE

Archibald B. McGinnis, Wheeling, W. Va., assignor to Wheeling Stamping Company, Wheeling, W. Va., a corporation of West Virginia Application March 22, 1943, Serial No. 480,015

11 Claims. (Cl. 215—43)

This invention pertains to plastic articles and it is particularly applicable to hollow articles, especially bottle and jar closures and the like.

In my copending application Serial No. 453,386, filed August 3, 1942, I have disclosed an article and method of making the same wherein the article is comprised of a reinforcing layer to which is integrally molded a layer of plastic molding compound. More particularly, the said application discloses a method of molding in which a plastic impregnated sheet of fabric, either paper or cloth, is pressed in a die along with a preform of molding compound, the two being shaped under heat and pressure into an integral shape. For example, in the formation of a bottle cap a resin impregnated fabric in cup form is placed over a forming die, a preform of molding powder is placed thereon, and then the die is closed by entering a force pin into it. A cap is produced in this manner, which, because of the continuous reinforcing sheet of fabric, is extremely resistant to breakage, cracking, and even when subjected to severe impact, may spall or chip without destruction of the cap. Relatively thin wall caps or other articles may be produced, or by using several layers of fabric, very heavy shock resistant articles, as for example army canteen caps, may be produced.

As disclosed in the said application, the plastic molding compound is placed inside the impregnated material, and the impregnated material is preferably preliminarily shaped to cap form. Under some conditions of molding certain difficulties are encountered which may be avoided by the present invention. One of these is that when the plastic molding compound inside the reinforcing piece begins to flow under heat and pressure, the enormous friction may tear the reinforcing piece, destroying the continuity of the reinforcement. Sometimes the reinforcement or parts of it are forced out of the mold.

In the present invention two improvements are provided to overcome such difficulties. One improvement is to use, as the reinforcement, a flat disk of resin impregnated fabric, either paper or cloth and to shape or draw it into cup form in the pressing operation. The other improvement comprises placing the preform of molding powder in the die under, instead of over, the reinforcement, so that, in the finished article, the molding compound is on the outside of the article and the fabric takes the shape of the force pin or other positive mold member. If the article be a threaded closure, the reinforcement will carry the thread.

In the accompanying drawings I have illustrated my invention applied to threaded closures but this is by way of illustration, and the invention is equally applicable to other articles.

In the drawings:

Figure 1 is a top plan view of a disk of fabric, either paper or cloth, impregnated with plastic molding compound;

Figure 2 is a view partly in section and partly in elevation, showing the disk of Figure 1 positioned over a mold cavity with the charge of molding compound inside the cavity and with the complementary die clear of the mold cavity;

Figure 3 is a view partly in section and partly in elevation showing the position of the parts at the conclusion of the molding operation;

Figure 4 is a fragmentary view of a portion of the completed article formed according to the present invention, the view being a vertical section through a part of the article;

Fig. 5 is a fragmentary sectional view in the plane of line V—V of Fig. 4, schematically illustrating the manner in which the reinforcing fabric is folded.

According to the present invention, a piece of fabric as, for example, a piece of cotton duck such as that commonly used in forming plastic articles, is impregnated with a plastic molding compound as, for example, resin of the phenol formaldehyde type in an incompletely reacted stage. Instead of using cotton duck, the fabric may be of any other suitable textile or may be of paper. A disk, designated 2 in the drawings, is cut from this fabric, the disk being of a diameter sufficient to produce the bottom and side walls of the hollow article which is to be made. As shown in Figure 2, a molding die 3, having a mold cavity 4 therein, is provided on its upper surface with a countersink 5 of a diameter sufficient to receive the disk 2. Before placing the disk 2 in the countersink in the face of the die, there is preferably first charged into the mold cavity a preform or tablet 6 of plastic molding compound compatible with the plastic impregnated in the disk. The molding compound, for example, may be a synthetic resin of the phenol formaldehyde type incompletely reacted and containing a filler of wood flour. The molding compound itself is commercially available and is of the type widely used in the plastic industry and constitutes no part of the present invention.

For cooperation with the cavity die 3, there is a plunger die or force pin 7 mounted on a die carrying member 8. When the mold has been charged in the manner described, the dies are closed. The dies which are of conventional form and construction are heated in the usual manner and to the customary molding temperature. As the dies close the impregnated disk is drawn down to cup form. The forcing of the disk down into the mold cavity by the force pin 7 causes the edge portion of the disk to fold or form pleats, which are more or less schematically shown in Fig. 5 where the pleats are designated 10a. When the preform 6 is subjected to pressure it flows outwardly and upwardly to envelop the fabric and, because of the presence of a compatible resin in the fabric, it bonds itself to the fabric. Where the upper mold member is threaded, as shown in the drawings, the fabric will be forced in to the threads so that the reinforcing layer actually forms the thread, thus forming the complete cap, or other article 9. Where the thread is quite sharp, and particularly in a very fine pitch thread, some of the plastic molding compound carried by the impregnated layer will be squeezed out of the reinforcing layer to form the peaks or ridges of such thread. This is illustrated in Figure 4 in which 10 designates the reinforcing layer shaped as indicated at 11 to conform to the threads on the force pin and bonded to the resinous body 12 formed from the molding compound. The tip portions 11a of the threads are shown as being a pure plastic which has been exuded under pressure from the fabric. The sharper the thread and the smaller the thread the greater is the proportion of the thread which is composed entirely of plastic.

By forming the reinforcing element of the cap from a disk of material without any slits or perforations, the fabric is less likely to tear in the operation of molding. Under the pressure under which the article is formed the creases in the side walls are flattened down and become entirely unnoticeable in the finished article. By placing the preform of molding compound in the mold cavity the molding compound flows more readily up the side walls of the cavity and forces the reinforcing layer inwardly against the threads of the force pin 7. It tends to hold the reinforcing layer tightly against the force pin rather than to force it out of the mold cavity as is the case where the preform is inside the reinforcing layer. There is some advantage in the cap with the molding compound on the exterior of the reinforcing layer in that if the cap is subjected to a blow tending to chip or break off some of the molding compound, the fragments so detached cannot enter the bottle or container to which the cap is applied and, even though substantially all of the outer layer of plastic is broken away, the reinforcing element will still retain its shape so as to form a seal for the container. This is particularly advantageous in a cap such as a canteen cap where the cap may be subjected to very heavy impact and abusive treatment. Another advantage results in the fact that the exterior of the cap looks no different from a cap made entirely of molding compound, whereas with the fabric on the exterior of the article the fabric may be readily seen in the outer surface of the article, and for some purposes this is objectionable.

By forming a countersink in the top of the cavity mold, the disk is readily centered with respect to the mold cavity and to the force pin so that the mold can be very rapidly charged.

While I have illustrated and described the formation of a screw threaded cap, it will be understood that the invention is applicable to the forming of various hollow plastic articles in which it is desirable to have a relatively strong impact-resistant structure which may at the same time have a relatively thin wall section. Also, where a stronger and thicker article is to be produced, several disks may be superimposed within the contemplation of my invention and under the scope of the following claims. Also, while I have mentioned paper and duck, any suitable fibrous sheet may be employed.

I claim:

1. A reinforced hollow plastic article having a resin impregnated reinforcing fabric sheet on the inner surface thereof, defining a substantially complete lining therefor, and having integrally bonded to the resin in said impregnated sheet and over the outer surface thereof a continuous layer of a resinous substance comprised of resinous molding compound.

2. A reinforced hollow article having a bottom and sides reinforced by a continuous integral reinforcing fabric sheet impregnated with resin and having bonded thereto over an entire surface thereof a continuous layer comprised of resinous molding compound shaped and integrally bonded to the resin content of the impregnated sheet under heat and pressure.

3. A reinforced hollow article having a bottom and sides reinforced by a continuous integral reinforcing sheet impregnated with resin and having integrally bonded thereto over an entire surface thereof a continuous layer comprised of resinous molding compound compatible with the said resin and shaped and integrally bonded to the impregnated sheet under heat and pressure, the reinforcing sheet being folded upon itself to form pleats in the side wall portions of the article.

4. A reinforced hollow article having a bottom and sides, said article being reinforced throughout by a continuous integral reinforcing sheet of fibrous material impregnated with resin and having integrally bonded over the entire exterior surface thereof a continuous layer comprised of resinous molding compound shaped and bonded to the impregnated sheet under heat and pressure, the impregnated sheet of fibrous material forming a complete lining covering the bottom and sides of the said hollow article.

5. A reinforced plastic closure comprising a reinforcing layer of resin impregnated fibrous sheet material and an external layer formed from resinous molding compound integrally bonded to the reinforcing layer, the closure having a skirt which is interiorly threaded, the reinforcing sheet material carrying the thread, and defining a continuous reinforcing lining for the closure over all portions thereof including the skirt.

6. A reinforced plastic closure comprising a reinforcing layer of resin impregnated fibrous sheet material and an external layer formed from resinous molding compound integrally bonded to the reinforcing layer, the closure having a skirt which is interiorly threaded, the reinforcing sheet material carrying the thread and being itself shaped to constitute the thread.

7. A reinforced plastic article having a threaded surface comprising a reinforcing layer of resin impregnated fibrous sheet material and a covering layer formed from resinous molding compound integrally bonded to the reinforcing layer, the reinforcing layer being pressed and molded to constitute the threaded surface.

8. A molded closure cap for receptacles, the cap being composed principally of molded resin, which cap comprises a cup-like body having a face portion and a wall portion extending from the face portion, and a continuous fabric reinforcing lining for the cup-like body forming an inner face for the said face portion and wall portion of the cup-like body with resin impregnating fabric, the lining extending substantially completely over the face portion and wall portion of the cup-like body, and being enveloped and resin in the fabric being fused with molded resin of the body.

9. A molded closure cap for receptacles, which cap is composed principally of molded resin and comprises a cup-like body having a face portion and a side wall portion extending from the face portion, and a continuous resin-impregnated fabric lining for the face portion, the said lining extending substantially completely over the face portion and side wall portion and defining a complete lining inner face thereof, the said fabric lining being exteriorly enveloped by the face portion and side wall portion of the said cup-like body, and the resin which impregnates the fabric being fused to the molded resin.

10. A molded closure cap assembly for receptacles, which assembly is composed principally of molded resin, and comprises a cup-like body having a face portion and a side wall portion extending from the face portion, and a continuous lining for the said face portion and side wall portion extending substantially completely thereover, the said lining being composed of a continuous sheet of resin-impregnated fabric defining a reinforcing inner surface for the said face portion and side wall portion of the cup-like body, the resin in the body and the resin in the fabric being integrally fused to both the fabric and the molded resin, the said resin-impregnated fabric lining being threaded for application of the cup-like body to a receptacle for which the finished closure cap is intended.

11. A molded closure cap assembly for a receptacle, which assembly is composed principally of molded resin and comprises a cup-like body having an end portion and a side wall portion extending from the end portion, and a continuous lining substantially covering the end portion and side wall portion, the said lining being composed of an integral sheet of resin-impregnated fabric defining a continuous reinforcing inner surface for the said end portion and side wall portion of the cup-like body, the said resin-impregnated fabric lining being folded upon itself to form pleats in the side wall portion thereof.

ARCHIBALD B. McGINNIS.

REFERENCES CITED

The following references are of record in the file of this patent:

UNITED STATES PATENTS

| Number | Name | Date |
|---|---|---|
| 1,755,597 | Greenewald | Apr. 22, 1930 |
| 2,173,449 | Kronman | Sept. 19, 1939 |
| 1,301,069 | MacDonald | Apr. 15, 1919 |
| 1,346,877 | Burroughs | July 20, 1920 |
| 2,131,319 | Greenholtz et al. | Sept. 27, 1938 |
| 1,914,273 | Meurling | June 13, 1933 |
| 1,606,680 | Wisner | Nov. 9, 1926 |
| 2,030,059 | Ferngren | Feb. 11, 1936 |
| 1,370,024 | Kempton | Mar. 1, 1921 |